(12) United States Patent
Harman

(10) Patent No.: US 11,402,469 B2
(45) Date of Patent: Aug. 2, 2022

(54) RADAR TARGET DETECTION SYSTEM AND METHOD

(71) Applicant: QINETIQ LIMITED, Hampshire (GB)

(72) Inventor: Stephen Anthony Harman, Malvern (GB)

(73) Assignee: QINETIQ LIMITED, Hampshire (GB)

( * ) Notice: Subject to any disclaimer, the term of this patent is extended or adjusted under 35 U.S.C. 154(b) by 194 days.

(21) Appl. No.: 16/306,790

(22) PCT Filed: Jun. 1, 2017

(86) PCT No.: PCT/EP2017/063365
§ 371 (c)(1),
(2) Date: Dec. 3, 2018

(87) PCT Pub. No.: WO2017/207716
PCT Pub. Date: Dec. 7, 2017

(65) Prior Publication Data
US 2019/0137605 A1 May 9, 2019

(30) Foreign Application Priority Data

Jun. 2, 2016 (GB) ...................................... 1609640
May 4, 2017 (GB) ...................................... 1707117

(51) Int. Cl.
*G01S 7/41* (2006.01)
*G01S 13/42* (2006.01)
(Continued)

(52) U.S. Cl.
CPC .............. *G01S 7/415* (2013.01); *G01S 7/352* (2013.01); *G01S 13/422* (2013.01);
(Continued)

(58) Field of Classification Search
CPC ........ G01S 7/415; G01S 7/352; G01S 13/422; G01S 13/424; G01S 13/426; G01S 13/52;
(Continued)

(56) References Cited

U.S. PATENT DOCUMENTS 3,747,105 A * 7/1973 Payne ...................... G01S 11/10
342/418
4,635,058 A * 1/1987 Sutphin, Jr. ............. G01S 13/86
342/52

(Continued)

FOREIGN PATENT DOCUMENTS

EP         0537841 A1    4/1993
WO    WO2016/030656 A1    3/2016

OTHER PUBLICATIONS

R.E. Gardner "Doppler Spectral Characteristics of Aircraft Radar Targets at S-Band" 1961, Naval Research Report 5659, at least p. 4 (Year: 1961).*

(Continued)

*Primary Examiner* — Erin F Heard
*Assistant Examiner* — Michael W Justice
(74) *Attorney, Agent, or Firm* — Kenealy Vaidya LLP

(57) ABSTRACT

A drone detection radar configured to identify, from information present on returns reflected from a target, the presence of a drone, by identification, within Doppler information on the returns, of: i) Doppler signals being characteristic of rotating parts of a motor; ii) Doppler signals being characteristic of rotating parts of a blade; and, by identification from temporal information in the reflected returns; and iii) signals being characteristic of flashing of the blade of a drone. The target is assumed to be a drone if signals i, ii, and iii are present above respective predetermined thresholds. The largest return from a drone is often from the body, but this is often filtered by a clutter filter. The identified parameters therefore improve detection ability. The charac- (Continued)

teristic form of the Doppler signals in some instances allow the body return to be implied, thus providing information as to drone velocity.

20 Claims, 2 Drawing Sheets

(51) Int. Cl.
*G01S 13/52* (2006.01)
*G01S 13/87* (2006.01)
*H01Q 21/20* (2006.01)
*G01S 13/56* (2006.01)
*G01S 7/35* (2006.01)

(52) U.S. Cl.
CPC .......... *G01S 13/424* (2013.01); *G01S 13/426* (2013.01); *G01S 13/52* (2013.01); *G01S 13/56* (2013.01); *G01S 13/878* (2013.01); *H01Q 21/205* (2013.01); *G01S 7/356* (2021.05)

(58) Field of Classification Search
CPC ........ G01S 13/56; G01S 13/878; G01S 13/44; G01S 13/4436; G01S 13/4445; G01S 13/4454; G01S 13/4472; G01S 13/449; G01S 13/4481; G01S 13/9092; G01S 2007/356; H01Q 21/205
USPC ..................................... 342/90, 80, 149, 427
See application file for complete search history.

(56) References Cited

U.S. PATENT DOCUMENTS

| | | | | |
|---|---|---|---|---|
| 5,689,268 | A * | 11/1997 | Shi | G01S 7/415 342/192 |
| 9,971,021 | B2 * | 5/2018 | Moses | G01S 13/536 |
| 10,261,173 | B2 * | 4/2019 | Lin | G01F 23/284 |
| 2003/0218565 | A1 * | 11/2003 | Budic | G01S 13/003 342/162 |
| 2010/0164784 | A1 * | 7/2010 | Longstaff | H01Q 21/08 342/202 |
| 2011/0241928 | A1 * | 10/2011 | Oswald | G01S 7/414 342/90 |
| 2012/0001790 | A1 * | 1/2012 | Edwards | G01S 7/415 342/160 |
| 2014/0139366 | A1 * | 5/2014 | Moses | G01S 13/933 342/63 |
| 2015/0323658 | A1 * | 11/2015 | Mitchell | G01S 13/937 342/128 |
| 2016/0025845 | A1 | 1/2016 | Allistair et al. | |
| 2017/0031013 | A1 * | 2/2017 | Halbert | G01S 7/414 |
| 2017/0285158 | A1 * | 10/2017 | Halbert | G01S 13/5244 |

OTHER PUBLICATIONS

J.J. M de Wit "Micro-Doppler analysis of small UAVs" 2012 IEEE 9th European Radar Conference (Year: 2012).*
Pulse Doppler Signature of Rotary-Wing Aircraft by Barry D. Bullard at Georgia Tech Research Institute by IEEE (Year: 1991).*
Recognition and Classification of Rotorcraft by Micro-Doppler Signature using Deep Learning by Ying Liu at University of Chinese Academy of Sciences (Year: 2018).*
Aircraft classification using micro-Doppler analysis by Dyana A Prajakta Sathe at Center for Adaptive Sensing Technology at Defence Institute of Advanced Technology (Year: 2017).*
Multiple Drone Type Classification Using Millimetre-Wave CW radar micro-Doppler data by Samiur Raham at University of St Andrews (Year: 2022).*
Collot, G., "Fixed/Rotary Wings Classification/Recognition," CIE International Conference on Radar (CICR-91), Beijing, China, Oct. 22-24, 1991, Proceedings Beijing International Academic Publishers 1991, pp. 310-612.
International Search Report and Written Opinion for PCT Patent App. No. PCT/EP2017/063365 (dated Sep. 6, 2017).

* cited by examiner

RADAR TARGET DETECTION SYSTEM AND METHOD

CROSS REFERENCE TO RELATED APPLICATION(S)

This application is a national phase filing under 35 C.F.R. § 371 of and claims priority to PCT Patent Application No. PCT/EP2017/063365, filed on Jun. 1, 2017, which claims the priority benefit under 35 U.S.C. § 119 of British Patent Application No. 1609640.6, filed on Jun. 2, 2016 and British Patent Application No. 1707117.6, filed on May 4, 2017, the contents of each of which are hereby incorporated in their entireties by reference.

Some embodiments relate to a system and method for the detection of targets using a radar system. More particularly, it relates to a system and method for detecting multi-rotor unmanned aerial vehicles, commonly referred to as drones.

Over the last few years the availability of model helicopters, remote piloted air systems (RPAS), Unmanned Aerial Vehicles (UAVs), multi-rotors and similar remote controlled aircraft of various types and sizes has increased dramatically, partially due to the decreasing cost of the technology that enables them to be flown without a great deal of skill and training. Such aircraft (herein otherwise referred to generally as drones) are often bought as toys, but they are often capable of carrying payloads such as cameras or other relatively light objects. This capability makes them useful for transporting objects into difficult to access locations, or carrying out monitoring or surveillance work.

It has not taken long for them to be used for socially undesirable or illegal tasks. A growing problem is the use of drones to deliver contraband into prisons, by flying the drone over a wall and landing it in an exercise yard or similar area. Other undesirable uses of drones include incursions into protected airspace, or invasion of privacy at sensitive areas.

A requirement has therefore arisen to be able to detect the use of drones. There has been developments in this area.

Acoustic sensors may be useful at very close range, but their utility deteriorates in noisy, urban environments. Video systems, including infra-red imaging systems, are useful for confirming a detected presence of a drone, but also suffer when in visually cluttered environments or in poor weather and darkness, and again often have difficulty detecting drones at longer ranges (such as more than several tens of metres), A wide angle lens provides good angular coverage but is unable to sense the drone at the longer ranges, whereas telephoto lenses provide good performance at long distances, but only with a very narrow field of view.

Radar systems can be used, but as the velocity of drones is so variable, and is often zero, they can easily get removed by the clutter filtration that radars often use to remove returns from static objects. Their velocities, and flight characteristics also often match birds, and so radars have been prone to high false alarm rates when used against drones.

"Fixed/Rotary Wings Classification/Recognition" by G Collot, Proc. CIE International Conference on Radar 1991 discusses the use of radar to identify types of rotary wing aircraft.

Some embodiments therefore provide a means for detection of drones that ameliorates at least some of the disadvantages of the related art.

Some embodiments provide a drone detection radar including a transmitter, receiver and a processor, wherein the processor is adapted to analyse signals transmitted by the transmitter, reflected from a target and received by the receiver, and to identify, from information present on the reflected returns, the presence of a drone, by identification, within Doppler information on the returns, of:

i) Doppler signals being characteristic of rotating parts of a motor;
ii) Doppler signals being characteristic of rotating parts of a blade; and,
   by identification from temporal information in the reflected returns:
iii) signals being characteristic of flashing of the blade of a drone;

wherein the target is assumed to be a drone if signals i, ii, and iii are present above respective predetermined thresholds.

Thus, some embodiments provide a system wherein, for a drone detection to be confirmed, three different characteristics of the signal need to be detected. Related art systems may detect temporal signals characteristic of blade flash, due to the blade changing its Radar Cross Section (RCS) as it rotates, and may use the detections to identify a particular type of helicopter. However, some embodiments, which are configured to also detect Doppler returns from the motor and the blade, is used to detect the initial presence of a drone, and also provides for a greater surety that the target is a drone, rather than some other object having rotating features.

Some embodiments also provide for the detection of drones that may be hovering, or may otherwise have a very low radial velocity to the radar, where normal Doppler detection of signals from the body of the target is not practicable. However, signal returns from the body of a drone may also be used as a secondary, or additional confirmation of the presence of a relevant target. Also, such body signal returns may be used in combination with the other returns to aid identification of the type of drone being detected.

It will be appreciated that blade flash includes a repetitive temporal sequence of peaks, wherein the peak signal return occurs when the blade presents itself tangentially to the radar, either when moving towards, or away from it. Thus, when a blade, including two aerofoils between a central motor connection point, is attached to a motor, a blade flash will occur twice for every revolution of the motor (combining the reflection from the receding part of the blade with that from the approaching part), whereas when a blade having three aerofoils is attached to a motor then a blade flash will occur six times for every motor revolution, with separate peaks for each approaching and receding part of the blade as it comes face-on (i.e. tangential) to the radar. The blade flash manifests itself as a large increase (for a short time, dependent upon the angular velocity of the rotor) in the RCS of the blade, and hence a large increase in the amplitude of the Doppler signals being returned from the blade. Typical blade flash rates for small (e.g. hobbyist) drones lie between 30 Hz and 150 Hz, although it will be appreciated that such drones vary in size, rotor length, number of rotors, and hence rotor speed, and will also vary depending upon the flight conditions.

Advantageously, embodiments may extend to a system further including a database of different drone models, the database having information relating to at least one of motor Doppler returns, blade Doppler returns, temporal blade flash measurements, and typical rotor angular velocities and blade lengths (and hence rotor tip speeds) of said different models, and wherein the system is arranged to compare the returns from the target with the information in the database, to identify a model of the target drone from those in the database. The database may retain the information in a coded, or statistical form, and the comparison may include of a comparison of statistical representations of the target returns, or a processed version thereof, and the information within the database.

A rotation rate (or, synonymously, angular velocity) may be inferred from blade flash measurements, and from any a-priori knowledge that narrows down the likely type or manufacturer of the target drone.

The radar system advantageously further includes a digitiser arranged to digitise the returns from the receiver, and to conduct further processing, such as may be done in the processor, upon the digitised signals.

The motors used to power the blades on small (e.g. hobbyist) drones tend to be brushless DC motors, with metallic rotating parts. When the motor is rotating, it will be appreciated by the skilled person that the motor will have lower Doppler frequencies than the blade. This is due to the motor having lower radial velocity than a blade connected thereto, for any given rotation speed. However, the metallic nature of the motor generally gives it a larger radar cross section (RCS) compared to the blade, which is often made from a plastic or composite material. This can lead to a characteristic pattern, in Doppler frequency, of the returns therefrom. At the lower Doppler frequencies, the motor therefore provides a relatively high signal, and at the higher Doppler frequencies the blade provides a reduced level, but still detectable signal, from reflections of the transmitted signal from different parts of the blade, each having their own radial velocities. These will be dependent upon, inter-alia, the size of the blade, and its rotation speed.

Therefore, the system may, in some embodiments, be arranged to look for a pattern in Doppler space matching the above description, and, if found, to recognise this as a detection of both the motor and the blade Doppler signals.

Preferably or advantageously, the radar is arranged to dwell for at least 50 ms on a region. More preferably or advantageously the radar is arranged to dwell for at least 70 ms, or 100 ms. It will be appreciated that a greater dwell time will allow a finer resolution in Doppler frequency to be measured, leading to improved detection of lower frequency signals, and their harmonics.

The identification of Doppler frequency signals corresponding to (i) and (ii) above may advantageously include of identification of harmonic structure within a lower frequency region (in absolute numerical terms) of Doppler returns from the target, and non-harmonic signals at a higher frequency region (again in absolute numerical terms) of the Doppler returns from the target, commensurate with frequencies expected from the Doppler velocity of a drone motor and blade respectively.

Alternatively, the identification of the signals corresponding to (i) and (ii) above may includes identification of an amplitude profile in an envelope signal of Doppler frequency returns from the target, the amplitude profile having a greater amplitude at lower frequencies commensurate with motor returns from a drone, stepping to a lower amplitude at higher frequencies commensurate with blade returns from a drone. The envelope may be obtained in any convenient manner, e.g. by averaging a plurality of Doppler frequency returns over a period, such as at least 50 ms, 70 ms, or 100 ms.

The Doppler signals may conveniently be obtained through a Fourier transform of the returns from the receiver, and wherein the Fourier transform is arranged to provide frequency information relating to Doppler velocities of at least 15 m/s for the returns in (i), and at least 100 m/s for the returns in (ii).

Advantageously, the identification of (iii) may include analysing a temporal sequence of amplitude returns of a length long enough to capture at least 5, and more preferably or advantageously at least 20 revolutions of the rotation of a typical drone motor,
and to perform time domain peak distribution analysis thereon.

Advantageously, the radar is arranged to detect a temporal flash rate between 30 Hz and 150 Hz. It has been found that this range is commensurate with that expected from hobbyist drones.

The blade flash signal may be found for example by analysis of the temporal signal from the receiver.

Advantageously, some embodiments may be configured to infer a position within the Doppler returns of an expected return from a body of a drone by assuming it to be approximately midway between corresponding positive and negative frequency characteristics of returns from a drone motor or blade. Such body returns may be removed by an earlier clutter filter, and so not be present in the signal at this point. However, the body return will sit approximately centrally within the Doppler frequency profile of returns from a motor or body. Thus, the radial velocity of the drone body may be likewise inferred from this.

Advantageously, the radar may be adapted to tag a track of a previously unidentified target as a drone if the target is at some point identified as a drone. This allows tracks of objects that are being recorded by the radar to be confirmed (or otherwise) as targets, and thence to treat the whole track as that of a drone. It may thus be analysed to see for example where it has previously been, to gain an idea as to where it originated.

Some embodiments provide a method of detecting a drone using a radar as claimed in any preceding claim, including:
  a) obtaining reflected radar returns from a target;
  b) analysing Doppler frequency information within the returns to identify Doppler frequency signals characteristic of reflections from a motor in a drone;
  c) analysing Doppler frequency information within the returns to identify Doppler frequency signals characteristic of reflections from a blade on a drone;
  d) analysing temporal information within the returns to identify amplitude signals characteristic of blade flash from a drone;
  e) providing an indication that the target is a drone if the analysis in steps b), c) and d) all identify signals that are above respective predetermined thresholds.

Advantageously, the analysis, in this embodiment, in steps (b) and (c) may include identification of harmonic structure within a lower frequency region of Doppler returns from the target, and non-harmonic signals at a higher frequency region of the Doppler returns from the target, commensurate with frequencies expected from the Doppler velocity of a drone motor and blade respectively.

Advantageously, the analysis in step (d) of this embodiment includes analysing a temporal sequence of amplitude returns of a length long enough to capture at least 5, and more preferably or advantageously at least 20 revolutions of the rotation of a typical drone motor and to perform time domain peak distribution analysis thereon.

Some embodiments will now be described in more detail and by way of example only, with reference to the following Figures, of which:

Figure 1:
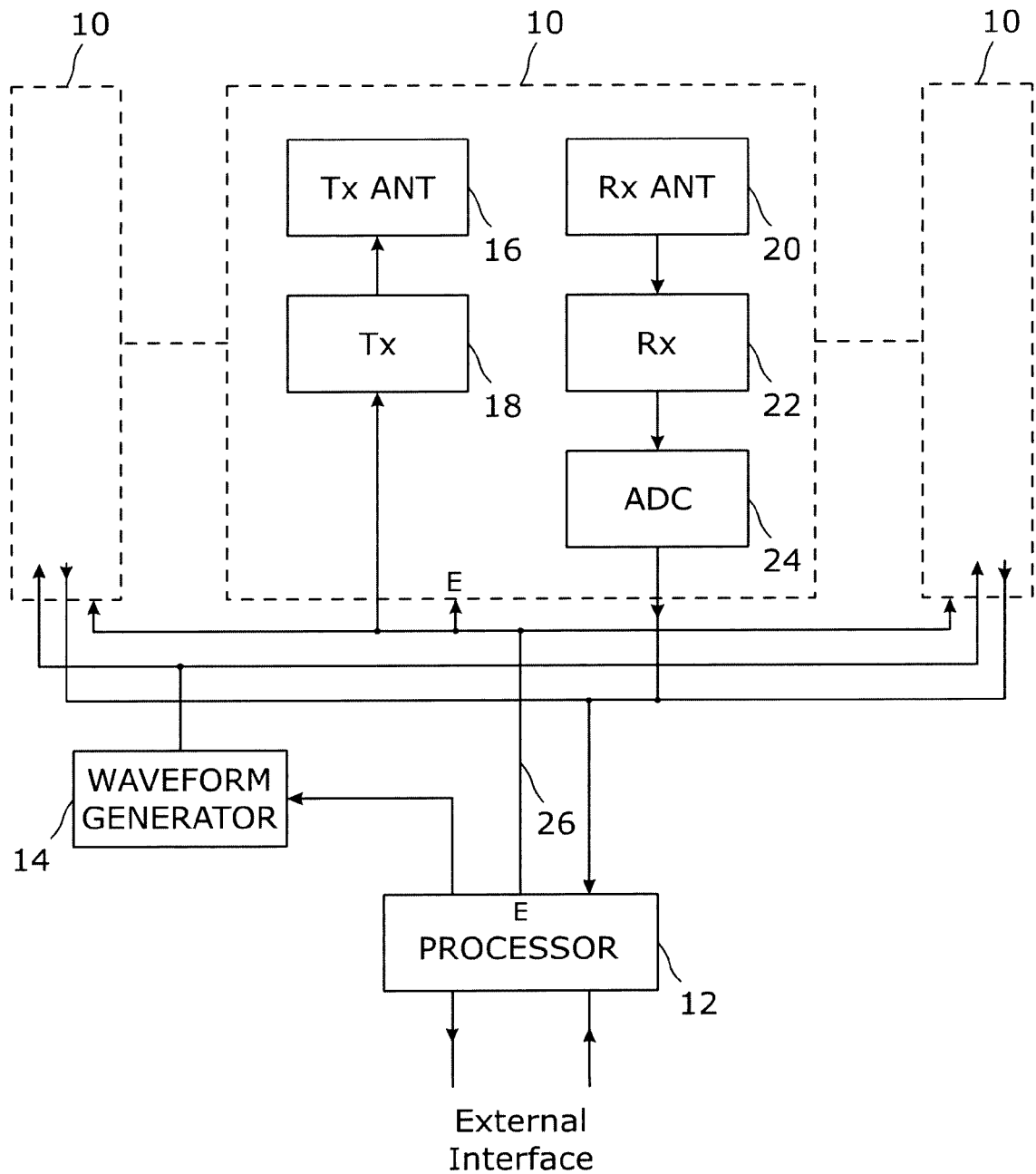
FIG. 1 shows a typical block diagram of a radar of some embodiments.

FIG. 1 shows a simplified block diagram of a radar suitable for implementation of one embodiment. This embodiment has five panels 10, of which one is shown in detail. Each panel is substantially identical in nature, and has front end electronics and antennas mounted thereon. The panels are mounted on a structure such that they each point towards different sectors to be monitored. Common to all panels is a processor 12, that also acts as an interface to waveform generator 14, as well as providing an interface to external systems, such as a display and controller, and to other radars.

Each panel 1 includes a transmit antenna 16, and transmitter circuitry 18, including a transmit amplifier. A receive antenna 20 is located adjacent the transmit antenna 16, and is connected to receiver front end circuitry 22 which contains amplification and down-conversion circuitry. A digitiser 24 is connected to an output of the receiver 22, which digitises the output and provides its digitised outputs to processor 12.

The processor also controls an enable function 26, that enables one (or, in some other embodiments, more than one) of the panels, while disabling the remaining ones.

It will be apparent to a normally skilled person that there are various interconnections between the components shown, and functions (such as power supplies, switching and routing components etc.), that have not been shown but may be necessary to produce a functional system.

In operation, the processor 12 chooses a panel to activate, by suitable control of its enable line to each panel. With one panel having been enabled, the processor controls the waveform generator to generate appropriate waveforms for transmission by the transmitter 18 and antenna 16 on that panel. The radar is a frequency modulated continuous wave (FMCW) radar that employs a frequency ramp, or chirp, that is transmitted. The received signal therefore includes of the chirped signal as reflected from (and modified by) objects within range of the radar.

The receiver antenna 20, and the receiver front end 22 receive signals such as any reflections of transmitted signals from objects in a volume to be monitored. The receiver circuitry 22 amplifies, filters, and downconverts the received signals by mixing it with a version of the transmitted chirp signal. It is then digitised by the digitiser 24. The digitiser 24 passes the digitised information back to the processor for processing. This processing includes at least running filtering, detecting, and target tracking, routines on the data from the panel.

The processor controls the duration of activation of the currently active panel (i.e. the dwell time), and, after that duration has elapsed, it switches to another panel and repeats the above process, storing any detected targets in memory. It cycles through the panels in sequence until all five have been activated, and then proceeds to repeat the cycle. Targets detected from the data in one panel may be tracked as they move to a different sector, as observed by another panel.

If a target of interest is found in one panel, then the processor may be arranged increase the dwell time for that panel, and may reduce the dwell time in another panel or panels where no targets have been detected.

The receive antenna may, in some embodiments, include an array of sub-antennas, each having their own beam pattern. The receiver may be therefore arranged, in these embodiments, to combine the returns from the separate antennas in different ways. In this way, an angle the drone makes with the antenna may be determined e.g. by implementing monopulse processing, Such processing is known, and will not be described further. Data obtained from such processing may aid subsequent tracking of detected targets, or targets that are suspected of being drones but have not yet been identified as such.

The radar thus captures returns from targets, and the processor processes the returns to detect targets. The processing is directed to detecting the Doppler characteristics of one or more motors, one or more blades, and temporal blade flashes, as discussed in more detail below.

FIG. 2 shows in general terms examples of the kind of returns that may be received from rotating elements on a drone, such as the prop or motor components. The return may be from a single motor, or may be from multiple rotors, where the rotation speed is substantially similar.

Figure 2A:
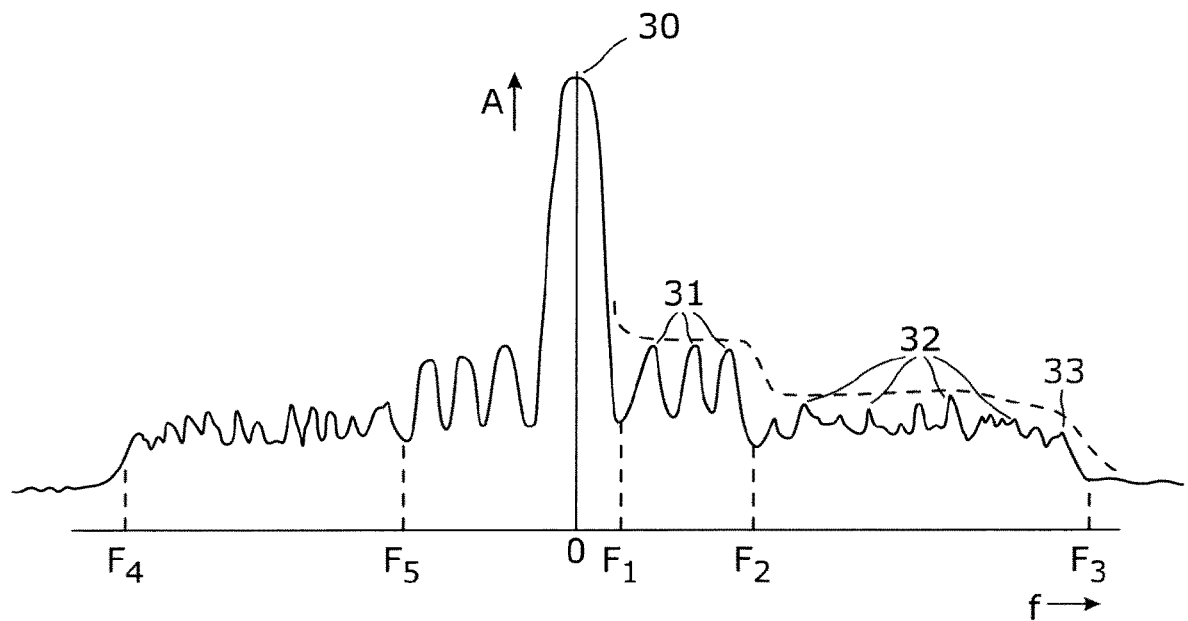
FIG. 2 shows a typical Doppler frequency return profile from a single motor with a horizontally mounted rotor blade attached thereto.

FIG. 2a shows a Doppler profile of a single drone motor with a blade attached thereto. Doppler frequency (double sided) is shown on the x-axis and arbitrary received power shown on the y-axis. A large component 30 comes from the body of the drone, which will be a DC component when the body is stationary in relation to the radar. Of course, if the body is moving, then this component will no longer be at DC, but will instead be at a frequency commensurate with the radial speed of the drone. However, the other frequencies (e.g. from the motor and blades) will also all vary by the same amount, and so the body component is herein referred to as the DC point on the Doppler spectrum. Peaks also appear (e.g. 31) at low frequencies from the motor component. These generally have an amplitude lower than that of the DC component, but are generally still significant in size. Thus, the returns between F1 and F2 include the motor returns. It will be understood that these are at a low frequency due to their location near the centre of rotation of the motor, and hence have a relatively low radial velocity.

Further out from the DC point, the returns are due to different parts of the blade, with the tips of the blade having the highest radial velocity and hence producing higher frequency components than those from the motor. These are shown between F2 and F3, and have peaks such as those at 32. On the negative frequency side, equivalent bands extend between F5 and F4 The value of F3, and hence the furthest extent (in Doppler frequency terms) of the energy from the drone body, is determined by the tip radial velocity of the blade (or blades) of the drone, as that is the fastest moving part.

The graph shows a typical snapshot in time of the Doppler profile from a blade (or multiple blades operating at the same speed) attached to a rotating motor on a drone, with all its various peaks and troughs. Dotted line 33 shows a typical envelope of the signal (for clarity shown only on the positive frequency side), e.g. as would be obtained by averaging, or peak-detecting the signal over time. A characteristic step in amplitude appears at F2, between the generally higher amplitude motor returns and the lower amplitude blade returns. Of course, the value of F2 will vary dependent upon the speed of the motor, and the amplitudes of the various components will vary dependent upon various factors, such as the orientation of the motor to the radar, and any shadowing from e.g. the body of the drone that might occur.

The returns 31 from a motor include of a series of harmonically related peaks, that occur a low frequencies (compared to the returns from the blades), and so this information may be used to aid in their identification. Blade Doppler return peaks 32 do not tend to have a simple, easily visible harmonic relationship, given that the motor will have small variations in its speed, the effect of which is amplified by the radial speed of the blades and their length. Thus their output is more variable in frequency, and appears largely random and noise-like in nature. A drone having longer blades will generally also have slower rotating blades, due to constraints on blade tip velocity. Such slower moving blades tend to provide a richer (i.e. denser) harmonic spectrum within the region F2 to F3. All of this is complicated further by the inclusion of returns from other motors and blades that are present on the drone. However, the characteristic envelope 33 and relative amplitude between the motor returns 31 and blade returns 32 are still generally retained.

Figure 2B:
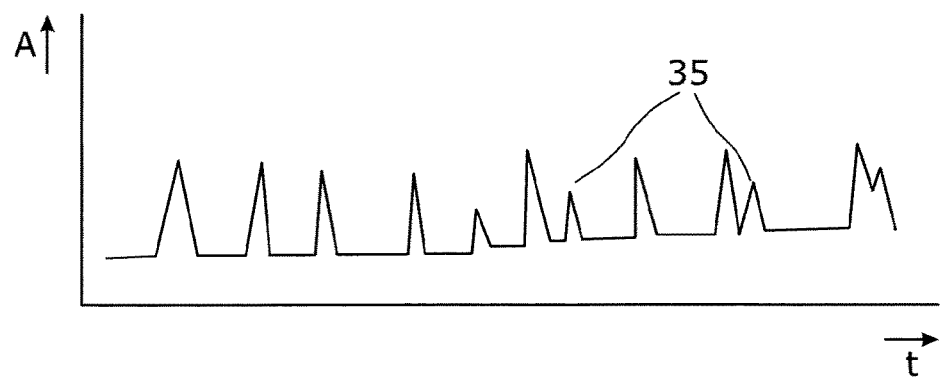

FIG. 2b shows a time domain representation typical of that often seen from a horizontally mounted rotor blade on a drone. The x-axis is time and the y-axis again is arbitrary received power. The representation includes of a generally regular series of sharp peaks. Each peak occurs when the blade rotates so as to have its axis perpendicular to the direction of view—i.e. it is being seen face-on. At that point, a comparatively large signal is reflected back, causing the peak shown. For a single rotor system at constant angular velocity, the series of peaks would be very regularly spaced, but of course, in practice, the rotors are changing speed quickly, and there are usually more than one visible to the radar at any one time. This can cause other peaks to be produced, such as those at 35. However, they still tend to have a noticeable peak present when it comes face-on, and so produces a significant, and relatively easily detected amplitude variation.

The signals as shown in FIGS. 2a and 2b are distinctive, and so can be detected by appropriate signal processing software running on processor 1, as is known to the normally skilled person. Statistical techniques, or pattern matching to expected spectra (such as the change in envelope amplitude at frequency F2 in FIG. 2a) may be used to detect e.g. motor and blade returns. Motor returns may also be detected by looking for harmonically related signals appearing at the expected Doppler frequencies in the Doppler spectrum. Blade Doppler frequency returns may include a series of peaks having a distribution that varies with the size of, and speed of rotation of the blade of the drone, where typically the peaks do not have a readily determinable harmonic relationship. The power spectral density may be used as a determinant in detecting such signals, within a frequency band in which such returns are expected to occupy. This may also be used to detect motor Doppler frequency returns, in its respective expected band. Band pass filters may therefore be used to isolate the energy from each respective return source. The blade flash signals may be found by methods such as time domain peak distribution analysis. This may include, for example, of identifying peaks appearing at intervals commensurate with expected rotation rates of the blades of a drone.

It will be appreciated that the peak 30 provides information relating to the true radial velocity of the drone. In some embodiments, the peak 30 may have been removed by a previous clutter filter operation, particularly if the drone is moving slowly, and the peak 30 is therefore at or close to a DC Doppler frequency return value. In such cases, the position of the peak 30 may be inferred once the motor and blade Doppler frequency returns have been found. Once energy has been detected that matches the expected pattern of a drone motor and blade Doppler returns, the position of any missing peak at (or near to) a DC value from the drone body may be assumed. For example, if a double sided (i.e. positive and negative Doppler frequency) measurement of motor and blade returns is obtained, as shown in FIG. 2a, the body peak position may be assumed to be at a point midway between F3 and F5, or alternatively midway between F2 and F4. This body peak position gives a frequency value that is dependent upon the radial velocity of the drone body, thus allowing measurement of the drone radial velocity. If the absolute values of F3 and F5 are equal, the peak 30 position is at 0 Hz, and has zero radial velocity.

The processor may be implemented in any convenient fashion. For example, it may include of a digital signal processor device, or may include of a field programmable gate array (FPGA), or may include of a general purpose processor, depending upon cost, speed, or other demands required by a particular embodiment. The programming of such devices to implement embodiments of the of the presently disclosed subject matter lies within the normal skill levels of a person of ordinary skill in the relevant art.

The processor may be arranged to use the detection of a drone as described above, to tag a track produced by the radar, of a previously unidentified potential target. For example, a target may be detected and tracked, using conventional signal processing on the radar returns, without confirmation that the target is a drone. It may be, for example, potentially a bird or a drone, or even a bicycle on the ground at that point. Once confirmation that the object is a drone, using methods as described herein, is performed, then the complete track of the target may then be tagged as being that of a drone. Analysis of its previous movements, as given by its track, may therefore be performed.

A tagged target, that has previously been confirmed as a drone, may likewise be tracked, by continuing identification as herein described, so that the track may be maintained even during periods of heavy clutter, such as from nearby birds etc. Even when lots of returns are being received from a region, where targets are moving in a similar fashion (velocity and trajectory etc.), only drones will provide the characteristic modulation to the returns as identified in claim 1. Therefore rejection of the clutter, and tracking of the targets of interest, becomes easier.

The invention claimed is:
1. A drone detection radar comprising:
   a transmitter, receiver and a processor, wherein the processor is configured to analyze signals transmitted by the transmitter, reflected from a target and received by the receiver, and to identify, from information present on the reflected returns, the presence of a drone, by identification, within Doppler information on the returns, of:
   i) Doppler signals being characteristic of rotating parts of a motor;
   ii) Doppler signals being characteristic of rotating parts of a blade;
   and,
   by identification from temporal information in the reflected returns:
   iii) signals being characteristic of flashing of the blade of a drone;
   wherein the target is assumed to be a drone if signals i, ii, and iii are present above respective predetermined thresholds on the reflected returns, and
   wherein the processor is further configured to determine a radial velocity of the drone based on a calculated body peak position in the Doppler returns, wherein the body peak position is calculated as a midway point between corresponding positive and negative frequency characteristics of returns from a drone motor or blade.

2. The radar according to claim 1 wherein signals reflected from the body of the target are further used to provide an indication of the presence of a drone.

3. The radar according to claim 1 wherein the radar is arranged to dwell upon a region for a time sufficient to measure a second harmonic of a Doppler return from a motor of a drone, when the motor exhibits a radial velocity of between 1 m/s and 15 m/s.

4. The radar as claimed in claim 1 wherein the radar is arranged to dwell for at least 50 ms on a region.

5. The radar as claimed in claim 1 wherein the identification of (i) and (ii) includes identification of an amplitude profile in an envelope signal of Doppler frequency returns from the target, the amplitude profile having a greater amplitude at lower Doppler frequencies commensurate with motor returns from a drone, stepping to a lower amplitude at higher frequencies commensurate with blade returns from a drone.

6. The radar according to claim 1 wherein the Doppler signals are obtained through a Fourier transform of the returns from the receiver, and wherein the Fourier transform provides frequency information relating to Doppler velocities of at least 15 m/s for the returns in (i), and at least 100 m/s for the returns in (ii).

7. The radar according to claim 1 wherein the identification of (iii) includes capturing a temporal sequence of amplitude returns of a length long enough to capture at least 5 revolutions of the rotation of a drone motor, and to perform time domain peak distribution analysis thereon.

8. The radar according to claim 7 wherein the flash rate lies between 30 Hz and 150 Hz.

9. The radar according to claim 1 wherein the system further includes a database of different drone models, the database having information relating to at least one of: motor Doppler returns, blade Doppler returns, temporal blade flash measurements, and typical rotor speeds and numbers of rotors of said different models, and wherein the system is arranged to compare the returns from the target with the information in the database, to identify a model of the target drone from those in the database.

10. The radar according to claim 1 wherein the radar is a Frequency Modulated Continuous Wave (FMCW) radar.

11. The radar according to claim 1 wherein the radar is adapted to tag a track of a previously unidentified target as a drone if the target is at some point identified as a drone.

12. The radar as claimed in claim 1, wherein the identification of (i) and (ii) includes identification of harmonic structure within a lower frequency region of Doppler returns from the target, and reduced harmonic level signals at a higher frequency region of the Doppler returns from the target, commensurate with frequencies expected from the Doppler velocity of a drone motor and blade respectively.

13. The radar as claimed in claim 12 wherein a position within the Doppler returns of an expected return from a body of a drone is inferred by assuming it to be approximately midway between corresponding positive and negative frequency characteristics of returns from a drone motor or blade.

14. A method of detecting a drone using a radar, comprising:
a) providing the drone detection radar of claim 1;
b) obtaining reflected radar returns from a target;
c) analysing Doppler frequency information within the returns to identify Doppler frequency signals characteristic of reflections from a motor in a drone;
d) analysing Doppler frequency information within the returns to identify Doppler frequency signals characteristic of reflections from a blade on a drone;
e) analysing temporal information within the returns to identify amplitude signals characteristic of blade flash from a drone;
f) providing an indication that the target is a drone if the analysis in steps c), d), and e) all identify signals that are above respective predetermined thresholds on the reflected radar returns; and
g) determining a radial velocity of the drone based on a calculated body peak position in the Doppler returns, wherein the body peak position is calculated as a midway point between corresponding positive and negative frequency characteristics of returns from a drone motor or blade.

15. The method as claimed in claim 14 wherein the returns are further analysed to detect signals reflected from the body of a drone.

16. The method as claimed in claim 14 wherein the analysis in steps (c) and (d) include identification of harmonic structure within a lower frequency region of Doppler returns from the target, and signals at a higher frequency region of the Doppler returns from the target having reduced harmonic relationship, and of lower mean amplitude level than the lower frequency signals, commensurate with frequencies expected from the Doppler velocity of a drone motor and blade respectively.

17. The method according to claim 14 wherein the analysis in step (e) includes analyzing a temporal sequence of amplitude returns of a length long enough to capture at least 5 revolutions of the rotation of a drone motor, and performing time domain peak distribution analysis thereon.

18. The method according to claim 14 wherein drone detections are used by a tracker to tag tracks of previously unidentified targets.

19. A drone detection radar comprising:
a transmitter configured to transmit at least one signal, receiver and a processor, wherein the processor is configured to analyze the at least one signal transmitted by the transmitter, reflected from a target and received by the receiver, and to identify, from information present on the reflected returns, the presence of a drone;
wherein the processor is further configured to analyze Doppler information on the returns to determine a radial velocity of the drone based on a calculated body peak position in the Doppler returns, wherein the body peak position is calculated as a midway point between corresponding positive and negative frequency characteristics of returns from a drone motor or blade.

20. A method of detecting a drone using a radar, comprising:
a) providing the drone detection radar of claim 19;
b) obtaining reflected radar returns from a target;
c) analyzing information present on the reflected radar returns, to identify the presence of a drone; and
d) analyzing Doppler frequency information within the reflected radar returns to determine a radial velocity of the drone based on a calculated body peak position in the Doppler returns, wherein the body peak position is calculated as a midway point between corresponding positive and negative frequency characteristics of returns from a drone motor or blade.

* * * * *